United States Patent [19]

Guenther

[11] 4,437,144

[45] Mar. 13, 1984

[54] HEIGHT-ADJUSTABLE SUPPORT ARM WITH A PARALLELOGRAM LINKAGE

[75] Inventor: Werner Guenther, Bensheim, Fed. Rep. of Germany

[73] Assignee: Siemens Aktiengesellschaft, Berlin & Munich, Fed. Rep. of Germany

[21] Appl. No.: 397,213

[22] Filed: Jul. 12, 1982

[30] Foreign Application Priority Data

Jul. 17, 1981 [DE] Fed. Rep. of Germany ... 8121048[U]
Jul. 17, 1981 [DE] Fed. Rep. of Germany ... 8121076[U]

[51] Int. Cl.³ .............................................. F21V 21/28
[52] U.S. Cl. .................................... 362/275; 362/269;
362/285; 362/287; 362/370; 362/371; 362/401;
362/404; 362/417; 362/419; 362/427; 362/430;
362/431; 362/804; 248/284
[58] Field of Search ............... 362/269, 275, 285, 287,
362/370, 371, 401, 404, 417, 419, 427, 430, 431,
804; 248/284

[56] References Cited

U.S. PATENT DOCUMENTS

| 2,941,776 | 6/1960 | Lauterbach | 248/284 |
| 3,786,244 | 1/1974 | Hutter | 362/804 |
| 4,328,536 | 5/1982 | Wallmark | 362/401 |

*Primary Examiner*—Stephen J. Lechert, Jr.
*Attorney, Agent, or Firm*—Hall, Van Santen, Steadman & Simpson

[57] ABSTRACT

A height-adjustable support arm with a parallelogram linkage has a stationary first articulated head and a second articulated head which is movable relative thereto, the second articulated head having a support bar connected thereto for mounting a device such as a hanging lamp. In order to avoid gaps in the exterior portion of the second articulated head, the movable parts thereof are surrounded by a flexible covering mounted on a tubular parallelogram leg at one end and at the free end of the support bar at its other end. The exterior dimensions of the covering correspond substantially to the tubular parallelogram leg and the interior dimensions are selected such that the second articulated head can move freely therein within an adjustment range.

9 Claims, 4 Drawing Figures

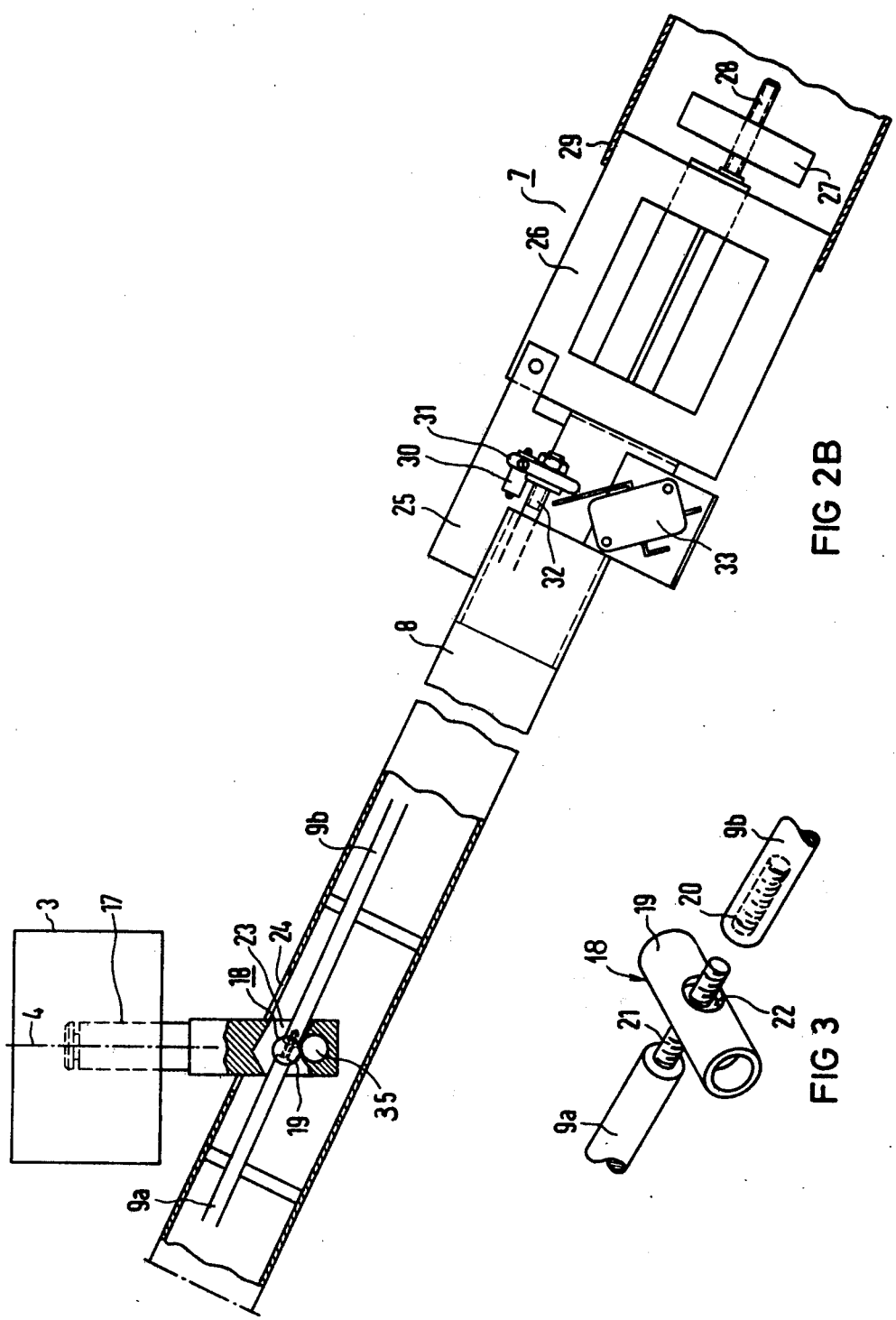

HEIGHT-ADJUSTABLE SUPPORT ARM WITH A PARALLELOGRAM LINKAGE

BACKGROUND OF THE INVENTION

1. Field of the Invention

The present invention relates to height-adjustable support arms, and in particular to such a support arm having a parallelogram linkage for supporting a hanging device, such as a dental lamp.

2. Description of the Prior Art

Height-adjustable support arms having a parallelogram linkage are known in the art for supporting various types of hanging objects and devices, such as a dental lamp. Such known support arms commonly have a first articulated head which is stationary and a second articulated head which is movable relative thereto for height adjustment. Such devices have a tubular member forming a first parallelogram leg disposed between the articulated heads and a rod forming the second parallelogram leg which is guided in the tubular member. Such devices further have a support bar mounted on the second articulated head at a free end of which the supported device, such as the dental lamp, is mounted.

Such conventional height-adjustable support arms have the disadvantage, particularly in employment in the medical and dental fields, that the movable parts which are visible from the exterior have gaps which permit the collection and penetration of dirt. The presence of the gaps additionally makes such surfaces difficult to clean to the standards necessary for medical use.

SUMMARY OF THE INVENTION

It is an object of the present invention to provide a height-adjustable support arm having a parallelogram linkage wherein no gaps at all are visible or accessible from the exterior of the support arm so that the support arm is easily cleanable and is thus ideally suited for use in medical environments.

The above object is inventively achieved in a support arm wherein the parallelogram linkage disposed between the articulated heads is surrounded by a flexible covering or sheathing which is mounted at one end to the tubular first parallelogram leg and is mounted at its opposite end to the free end of the support bar. The exterior diameter of the flexible covering substantially corresponds to the dimensions of the tubular parallelogram leg, and the interior dimension of the flexible covering is selected such that the parallelogram linkage associated with the second articulated head can move freely within its normal adjustment range inside of the covering.

The flexible covering may consist of rubber or plastic tube or hose, or may consist of ribbed or spiral tubes comprised of plastic or metal which have the advantage of bending without significantly altering the cross-sectional profile of the tube. With such coverings a continuous transition from the support arm to the supported device can be achieved for all inclination positions.

The support arm with the covered parallelogram linkage has particular applicability in the field of dental technology, in particular for supporting a dental lamp which is operated with low voltage by means of a transformer interconnected between the lamp and the mains line. Although some conventional support arms for dental lamps utilize a spring force in order to compensate and balance the weight of the lamp, in a further embodiment of the present invention the transformer can be utilized as a counterweight to balance the weight of the lamp, in which case the transformer is disposed in a housing at one end of the adjustable portion of the support arm unit. Within the housing, viewed in the longitudinal direction of the support arm, several mounting points may be provided for the transformer so that the transformer can be mounted therein at a distance from the lamp at the opposite end of the arm so as to achieve an optimum lever are to balance the lamp. A means may also be provided in the housing for supporting additional weights if necessary. In this embodiment, a threaded rod, also disposed in the longitudinal direction of the support arm, may be provided onto which one or more weights are screwed.

In a further embodiment of the invention, the housing may be provided with a switch such as a microswitch which is disposed such that the switch is activated by relative movement of parts of the support arm unit during height adjustment so that the lamp will be automatically energized when the support arm is moved to an actuating position.

BRIEF DESCRIPTION OF THE DRAWINGS

FIG. 2B is a side view, partly in section, showing the height adjustment linkage and the counterweight for the support arm shown in FIG. 1.

FIG. 3 is an enlarged perspective view of a designated portion of FIG. 2B.

DESCRIPTION OF THE PREFERRED EMBODIMENTS

Figure 1:
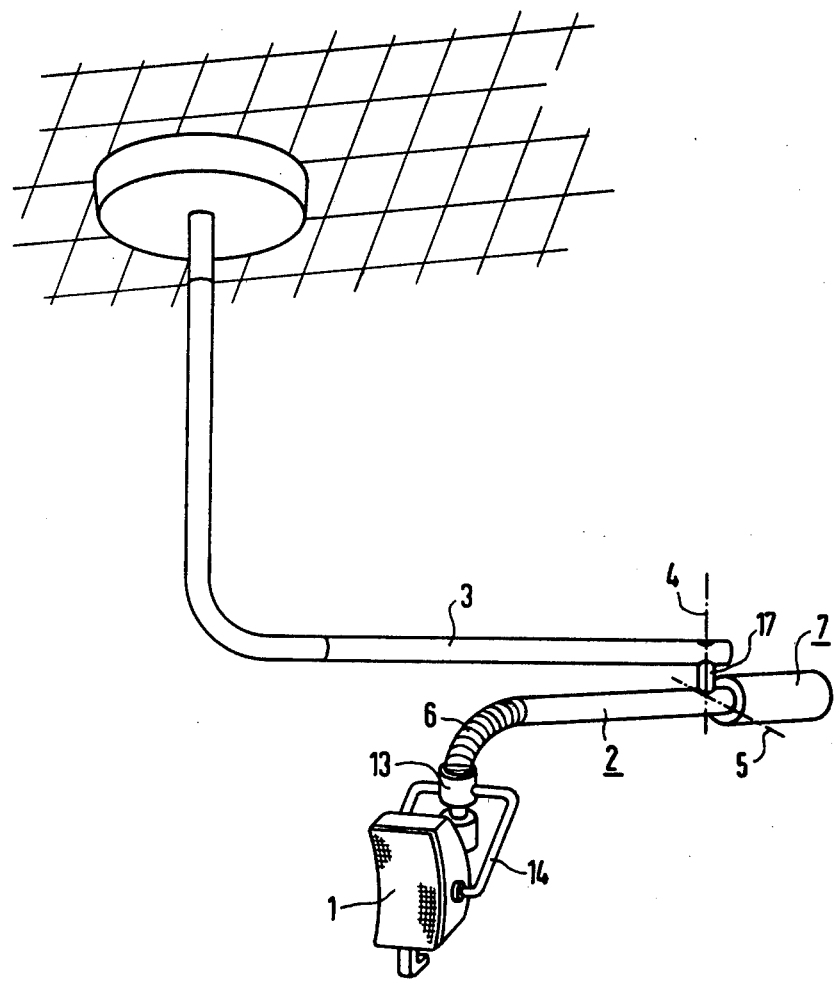
FIG. 1 is a perspective view of a support arm constructed in accordance with the principles of the present invention suspended from a ceiling mount.

A height-adjustable support arm unit is shown in perspective view in FIG. 1 in an embodiment for supporting a dental lamp 1. The unit consists of a support arm 2 which is rotatable about a vertical axis 4 by means of a suitable ceiling suspension unit 3 and which is tiltable about a horizontal axis 5 for adjusting the height of the lamp 1. The support arm 2, seen from the exterior, is entirely closed or sealed by a flexible covering 6. All elements which are displaceable relative to one another during a height adjustment caused by a parallelogram linkage system described in greater detail below, are all disposed inside the covering 6 and therefore form no gaps or the like which are visible from the exterior into which dirt can penetrate and accumulate, thereby making the entire unit easily cleanable and thus ideally suited for use in medical environments. In the embodiment shown in FIG. 1 the unit has a counterweight 7 disposed at the opposite end of the support arm 2 from the lamp 1 for balancing the weight of the lamp 1.

Figure 2A:
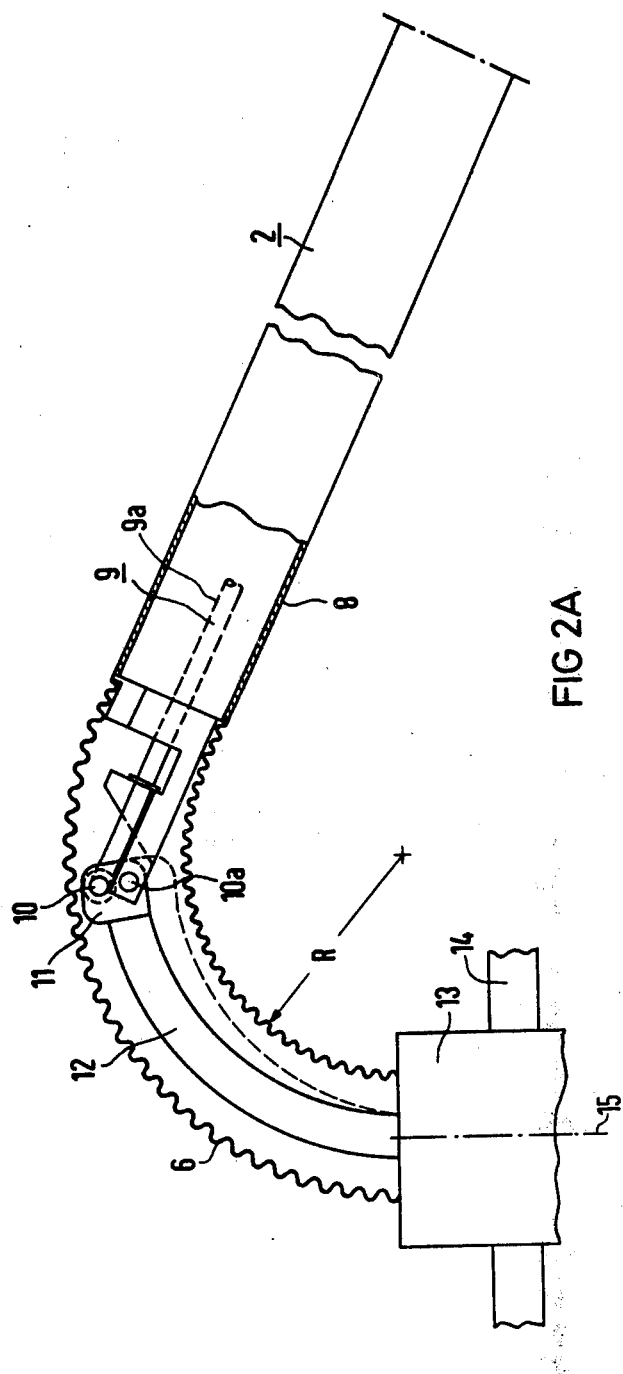
FIG. 2A is a side view, partly in section, showing the parallelogram linkage of the support arm of FIG. 1.

The details of the parallelogram linkage contained in the covering 6 are shown in FIG. 2A, and the linkage and a further counterweight embodiment at the opposite end of the support arm 2 are shown in FIG. 2B.

As shown in FIG. 2A, the support arm 2 has a tubular element 8, which may be a square or round tube, which forms a first parallelogram leg in the linkage. The support arm 2 further has a rod 9 which is guided in the tubular element 8 which forms the second parallelogram leg in the linkage. The two parallelogram legs formed by the tubular member 8 and the rod 9 are mounted by means of axle bearings 10 and 10a in a second articulated head 11 to which an arcuate support bar 12 is attached. A bushing 13 is rotatably mounted at the free end of the support bar 12 to which a stirrup 14 is attached and to which in turn the lamp 1 is mounted. The lamp can thus be rotated about a vertical axis referenced at 15.

The flexible covering 6, which may consist of a spiral or corrugated tube, surrounds the support bar 12, the articulated head 11 with the bearings 10 and 10a, as well as both legs of the parallelogram linkage. The flexible covering 6 is mounted to the tubular parallelogram leg 8 and has an exterior diameter substantially corresponding to that of the tubular element 8 and is mounted at its opposite end to the bushing 13 in a manner which permits the bushing 13 to rotate relative to the support bar 12 and the covering 6. The interior diameter of the flexible covering 6 is selected such that the articulated head 11 and the support bar 12 can freely move within the adjustment limits therein. Thus, the articulated head 11 in the uppermost position illustrated in FIG. 2A is disposed with its upper edge closest to the interior surface of the flexible covering 6. The articulated head 11 may be moved to a lowest position, shown in the dashed lines in FIG. 2A, wherein its lower edge is closest to the interior surface of the flexible covering 6. As a consequence of the flexibility of the covering 6, the covering 6 follows the curvature or arc R which is traversed during a height adjustment without changing the cross-sectional profile of the flexible covering 6.

As shown in FIG. 2B, a first articulated head is disposed at the opposite end of the support arm 2 which consists of a pin 17 rotatably mounted so that the axis of the pin 17 is coincident with the axis 4 shown in FIG. 1. The pin 17 receives two axle bearings 35 and 18 of the parallelogram linkage which are stationary with respect to the movable axle bearings 10 and 10a. The lower axle bearing 35 has an axis which is coincident with the axis 5 shown in FIG. 1 and thus forms a fixed rotational point about which the support arm pivots during a height adjustment. The bearing journal of the bearing 35 is part of the parallelogram leg formed by the tubular member 8. The upper axle bearing 18 is formed by a bushing 19 rotatably mounted in the pin 17.

The bar 9 is subdivided into two sections 9a and 9b which are interconnected by means of a screw coupling 18, which is shown in an enlarged perspective view in FIG. 3. The section 9a of the bar 9 terminates in a threaded stem 21 which projects through a transverse bore 22 in the bushing 19 and is received in a threaded bore 20 in the other section 9b of the bar 9. When screwed tightly together, the two bar sections 9a and 9b are braced against the bushing 19 so that the bar 9 can unobstructedly execute the relative movements which result during pivoting of the support arm 2. The pin 17 is provided with a corresponding recess 23 to accommodate such movement. Similarly, the tubular member 8 forming the first parallelogram leg has a corresponding recess 24 for permitting such movement.

In the embodiment shown in FIG. 2B, the counterweight 7 consists of a transformer 26 for the lamp 1 disposed in a housing 25 mounted on the tubular member 8. The transformer 26 serves the electrical purpose of matching the lamp voltage (commonly 12 volts) to the conventional mains supply voltage (commonly 220 volts). The transformer 26 within the housing 25 may be mounted therein at various locations viewed in the direction of the longitudinal axis of the support arm 2 in order to vary the lever arm for balancing different lamp weights. Alternatively, the transformer 26 may be rigidly mounted within the housing 25 in which case adjustment of the counterbalance weight may be achieved by means of one or more additional weights 27 screwed onto a threaded rod 28 carried at the end of the transformer 26. The additional weights 27 may be covered with a cover 29 which is press fit over the entire structure.

The tension or resistance to movement of the support arm 2 is established by a friction block 30 which is mounted on a member 31 and which presses against a surface of the housing 25. For improved guidance, the housing 25 may be provided with a groove through which a guide bolt, mounted on the element 31, passes. In order to reinforce the frictional force a further friction block may be disposed on the exterior surface of the housing 25 in addition to the frictional block disposed against the interior surface. For mounting the element 31, the section 9b of the bar 9 leading from the pin 17 into the housing 25 may be provided with a threaded end 32. The element 31 may also serve as an actuating means for a switch 33, such as a microswitch, also mounted in the housing 25. The switch 33 is disposed such that when the support arm 2 is in an upper or non-use position, the switch 33 is not actuated as a consequence of which the lamp 1 is switched off. Upon the occurrence of a downward pivoting or swiveling of the support arm 2 due to relative movement between the bar 9 and the tubular element 8 the element 31 will move and actuate the switch 33, thereby switching the lamp 1 on.

Although modifications and changes may be suggested by those skilled in the art it is the intention of the inventor to embody within the patent warranted hereon all changes and modifications as reasonably and properly come within the scope of his contribution to the art.

I claim:

1. A height-adjustable support arm comprising:
   a stationary first articulated head connected to a mounting means for said support arm;
   a second articulated head movable relative to said first articulated head;
   a parallelogram linkage including and connecting said first and second articulated heads, said parallelogram linkage further including a tubular member forming a first leg of said parallelogram linkage and a rod slidably guided in said tubular member forming a second leg of said parallelogram linkage;
   a support bar connected to said second articulated head having a free end to which a device to be supported is attached; and
   a flexible sheathing completely surrounding and covering said second articulated head and said support bar, said sheathing having an exterior diameter substantially equal to the diameter of said tubular member and having one end connected to said tubular member and an opposite end connected to the supported device for permitting free movement of said second articulated head and said support bar within said sheathing.

2. The support arm of claim 1 wherein said flexible sheathing maintains a substantially constant cross-sectional profile during movement of said second articulated head and said support bar.

3. The support arm of claim 2 wherein said flexible sheathing is comprised of spiral tubing.

4. The support arm of claim 1 wherein said support bar and said flexible sheathing are arcuate.

5. The support arm of claim 1 wherein said supported device is a dental lamp and further comprising a transformer for said dental lamp mounted at an opposite end of said support arm from said dental lamp adjacent to said second articulated head, said transformer simultaneously functioning as a counterweight for balancing the weight of said dental lamp, and further comprising a housing surrounding said transformer.

6. The support arm of claim 5 further comprising a plurality of mounting points for said transformer on said support arm disposed in a longitudinal direction of said support arm at different distances from said dental lamp for selecting a mounting point for said transformer for optimally balancing the weight of said dental lamp.

7. The support arm of claim 5 further comprising at least one additional weight and a means in said housing for supporting said additional weight for balancing the weight of said dental lamp.

8. The support arm of claim 7 wherein said means for supporting said additional weight is a threaded rod connected to said support arm onto which said additional weights are screwed.

9. The support arm of claim 5 further comprising an electrical switch in said housing and a means for actuating said electrical switch for energizing said dental lamp during movement of said support arm.

* * * * *